Patented Mar. 1, 1949

2,463,496

UNITED STATES PATENT OFFICE 2,463,496

ACCELERATING PHOSPHATE COATING WITH INDIGOID COMPOUNDS

William S. Russell, Detroit, Mich., assignor to Parker Rust Proof Company, Detroit, Mich., a corporation of Michigan No Drawing. Application July 10, 1943,
Serial No. 494,259

19 Claims. (Cl. 148—6.15)

This invention relates to the treatment of metals by chemical means and particularly to the production of phosphate coatings thereon.

It is well known that ordinary paint finishes do not adhere well to bare metal surfaces. It has become common practice to provide the metal with an insoluble finely crystalline phosphate coating prior to finishing in order to overcome this difficulty. The chemical coat must be relatively thin so as to avoid excessive absorption of the paint and the consequent dulling of the desired luster. Phosphate coatings are also used on metal where the primary object is to increase the corrosion resistance. Usually such coatings are saturated with oil or the like to augment the protective effect of the phosphate, and for this purpose a relatively heavier and more absorbent coating is desired than where it is used as a bond for paint.

Coatings which are to be used as a paint base are ordinarily obtained with a treating time of thirty seconds to five minutes, depending among other factors, on the composition of the coating bath, its method of application, the kind of metal treated and the exposure to which it will be subjected before painting. The action of the solution is usually accelerated by the presence of an oxidizing agent, such as a nitrate or a nitrite, with or without a metal accelerator such as a compound of copper.

Different compositions are required where the heavier oil retaining type of coating is required, and the processing time may run as long as thirty minutes to an hour and a half before the desired coating is produced. Usually, the oil-retaining type of coating weighs well above 800 milligrams per square foot of coated surface, while paint-bonding coatings are usually well below that weight.

The formation of phosphate coatings on metals involves a chemical attack on the metal surface and the simultaneous precipitation on the surface of insoluble phosphates of the coating metal employed in the solution and also of the metal being coated. When employing nitrates, nitrites, and other commonly used oxidizing accelerators, it is customary to facilitate the rapid coating by some super-saturation of the solution with the coating phosphate, as that conduces to the deposition of the coating phosphate along with phosphate formed by reaction with the metal being coated. However, some reaction with the surface being coated is requisite for the desired firm adherence of the coating, and too great super-saturation interferes with this reaction with the metal. Excessive super-saturation is undesirable for the further reasons that it results in greater precipitation of sludge with its attendant difficulties in operation and cleaning and its waste of chemicals, with the consequent necessity for greater and/or more frequent replenishing. Therefore, it is desirable to reduce super-saturation to the lowest point which will result in coating within the available time.

The dihydrogen phosphate of zinc is most commonly used in the chemical coating of metal where phosphate coatings are produced. When nitrates are used to accelerate its action, it is found advisable to increase the amount of metal in the bath over that normally obtained from the phosphate so as to increase the tendency of the less acid, insoluble phosphates to precipitate out of solution. The amount of the coating metal has been increased by employing it as the base metal in nitrate added to the solution.

Nitrites, such as sodium nitrite, decompose quite readily when added to a phosphate coating solution. The sodium in the sodium nitrite most commonly used has a neutralizing effect, which causes a considerable degree of super-saturation.

An object of my invention resides in the use of a different type of accelerator than has heretofore been used, which has advantages which will appear as the description proceeds.

This object is accomplished by supplying the accelerator in the form of an organic sulphonated compound of the group of chemical compounds designated by the generic term, indigoids. These accelerators are capable of producing on ferrous surfaces either the relatively thin type of coating required, where the coated object is to be painted, or a heavier coating approaching in weight or oil absorbing ability those usually employed primarily for corrosion resistance. Both varieties of coating may be produced from the same solution and in a very short time, as will be explained.

In contrast to the described use of nitrates, the indigoids operate with complete success in the absence of super-saturation other than that which naturally occurs during the coating operation. In fact, they have been found to operate successfully in a phosphate solution containing phosphoric acid in excess of that present in normal operations. Furthermore, the properties of the indigoids make possible a simplified coating method in that different types of coatings may be produced from the same solution.

The following specific examples are given to illustrate my invention. It is understood, however, that they are given only by way of illustration since many other variations and combinations are possible.

*Example 1*

An aqueous zinc dihydrogen phosphate coating solution was prepared by adding for each gallon of water, 85 c. c. of a concentrated material prepared by dissolving zinc oxide in 75% phosphoric acid in the proportions of 600 lb. of the oxide to 2550 lb. of the acid, then adding water to produce a strength of 44.5° Bé.; at 80° F. The diluted solution was placed in the reservoir of a machine equipped with a circulating pump connected to suitable spray nozzles inside an inclosed chamber. These were arranged in such a way that the metal to be coated would be impinged by the phosphate solution over substantially its entire surface. Means were also provided for heating the solution to the desired temperature. The solution was heated to 180° F. and sprayed for a sufficient length of time to cause substantially complete hydrolysis of the phosphate, i. e., until there was no material amount of supersaturation. Sheet steel sprayed with the solution for two minutes received, for all practical purposes, no coating. There was then added to the solution .25% of the sodium salt of thioindigo disulfonic acid (the sulphonated product of the compound known by the trade name, Ciba Pink B), and other steel sheets were sprayed under otherwise the same conditions. A definite acceleration of the coating formation was evident. The coating was heavy and uniform. Further additions of the sulphonate in steps of .25% caused an increase in the amount of coating obtained and also increased its adhesion to the metal. The optimum concentration of the accelerator appeared to be about 1%, since no appreciable change in the results occurred when the amount was increased to 1.25%. Prolonged spraying of the solution at this point, without running any production, caused no deterioration in acceleration as shown by subsequently processed metal.

Coatings obtained in but one minute spraying time were very similar in oil absorbing ability and in texture to those ordinarily requiring thirty to ninety times as long a processing period for their production.

The temperature of the coating solution was allowed to gradually fall, and other steel sheets were processed at intervals. The trend of the coatings was to become progressively thinner and more compact as the temperature was lowered. For usual oil-absorbent coatings, the temperature should be above 150° F., and below that for paint bonds. Coatings like those in wide use as a paint base were obtained at from 120° down to 75° F., or approximately room temperature.

Thus identically the same solution could be used at low temperatures to produce a paint bond or at higher temperatures to form an oil absorbent.

A solution such as described was also found to coat other metals, including zinc, magnesium, copper, and aluminum, the latter two of which are not coated by ordinarily phosphate solutions expedited by nitrate.

*Example 2*

Excellent acceleration of the coating formation on steel was obtained when the sodium salt of 2-thionaphthene-2' acenaphthylene indigo disulfonic acid (obtained by sulphonation of the product known by the trade name, Ciba Scarlet G) was employed in a zinc phosphate solution such as previously described, in place of the accelerator of Example 1, using comparable amounts of the accelerator under operative conditions similar to those previously described.

The trend as to the formation of the two different types of coatings was likewise obtained, the higher temperatures producing the heavy, relatively soft variety and the finer grained, thinner coatings being formed at the lower temperatures.

A zinc phosphate solution containing .25% of the sodium salt of sulfonated Ciba Scarlet G was also successively employed in coating surfaces of zinc, magnesium, aluminum, and copper.

*Example 3*

An aqueous coating solution was prepared by dissolving approximately 85 grams of manganese dihydrogen phosphate per gallon of water. A composition of this nature will ordinarily require from one-half to one and one-half hours to form a satisfactory coating on steel. The sodium salt of Ciba Scarlet G disulfonic acid was added in the amount of 1%. The bath was heated to approximately 210° F. and steel sheets immersed therein for two minutes. A phosphate coating which was entirely satisfactory in appearance, coverage, texture, and adhesion, was produced. Definite acceleration was also obtained in the coating of steel when the solution was sprayed. In this method of application, however, it is difficult to maintain the higher temperatures most favorable in the operation of manganese phosphate solutions.

*Example 4*

A zinc acid phosphate solution was prepared similar to the preceding and used in spray equipment such as described. The sodium salt of indigotin disulphonic acid (trade name, Indigo Carmine) was added in the amount of .25%. The solution was heated to 90° F. and was used for the coating of steel with a processing time of one minute. Thin and compact phosphate coatings typical of those employed for paint bonding purposes were obtained. Increasing the temperature by steps to 160° F. caused increasing heavier coatings to be formed. With the accelerator increased to 2%, a somewhat more compact deposit was obtained than with lesser amounts.

As previously indicated, the invention is concerned with the use of sulphonated indigoids in phosphate coating solutions for the purpose of accelerating the formation of coatings on metals. The indigoids as such are insoluble in water and so are of no value for use in an aqueous solution. Sulfonation increases their water solubility, but the possible degree of sulfonation varies among different indigoids. Also the same degree of sulfonation does not necessarily produce the same degree of solubility. For example, an unbrominated compound may be rendered sufficiently soluble by a degree of sulfonation which would be inadequate for one containing several bromine atoms. Likewise, the acceleration obtained may vary for the same dissolved amount of different compounds. Therefore, the amount required to furnish a given degree of acceleration will vary from compound to compound.

In general, it can be stated that in the case of spray processes where the processing time is short and is more or less regulated by mechanical arrangements whose adjustments are impractical to alter to a material degree, a higher amount of the accelerator is required than where the processing is carried out by immersing the metal article and the equipment is operated manually in such a way that the processing time can be conveniently varied. In this latter instance, a relatively low concentration of the accelerator may be readily compensated for by a suitable increase in the processing time.

It can therefore be readily seen that it is impractical to state a general rule as to the quantity of accelerator required or the degree of solubility which it must have. The accelerating compound must, however, be sulfonated to a sufficient degree and be of such a character that it will provide adequate acceleration in any specific instance.

Other dihydrogen phosphates, including those of ferrous iron, calcium, and cadmium, may have their coating action accelerated by the compounds described. The concentration, temperature, and method of application of the coating solutions and the kind of metal surface coated may vary widely and benefit still be derived from the use of the new class of accelerating agents described.

During the coating operation, the indigoids become, in part, reduced to the leuco compounds. These are capable of oxidation by the air to the original substances. When the coating process is carried out by the spray method, the maximum benefit is derived from the accelerator since it is capable of being used repeatedly. Economy of operation is thus effected.

What I claim is:

1. The method of producing a phosphate coating upon a surface composed principally of metal of the group consisting of iron, zinc, magnesium, copper, and aluminum, which comprises subjecting the surface to the action of a solution containing as its essential coating chemicals an acid phosphate of metal of the group consisting of zinc, manganese, iron, calcium and cadmium, and accelerating the coating action of the solution by a sulphonated indigoid compound dissolved in the solution in an amount sufficient to effect such acceleration.

2. The method of producing a phosphate coating upon a surface composed principally of iron, which comprises subjecting the surface to the action of a solution containing as its essential coating chemicals an acid phosphate of metal of the group consisting of zinc, manganese, iron, calcium and cadmium, and accelerating the coating action of the solution by a sulphonated indigoid compound dissolved in the solution in an amount sufficient to effect such acceleration.

3. The method of producing a phosphate coating upon a surface composed principally of zinc, which comprises subjecting the surface to the action of a solution containing as its essential coating chemicals an acid phosphate of metal of the group consisting of zinc, manganese, iron, calcium and cadmium, and accelerating the coating action of the solution by a sulphonated indigoid compound dissolved in the solution in an amount sufficient to effect such acceleration.

4. The method of producing a phosphate coating upon a surface composed principally of metal of the group consisting of iron, zinc, magnesium, copper, and aluminum, which comprises subjecting the surface to the action of a solution containing as its essential coating chemicals an acid phosphate of metal of the group consisting of zinc, manganese, iron, calcium and cadmium, said solution being supersaturated only to the extent that it becomes so by reaction with the work, and accelerating the coating action of the solution by a sulphonated indigoid compound dissolved in the solution in an amount sufficient to effect such acceleration.

5. The method of producing a phosphate coating upon a surface composed principally of metal of the group consisting of iron, zinc, magnesium, copper, and aluminum, which comprises subjecting the surface to the action of an aqueous solution containing as its essential coating chemicals an acid phosphate of metal of the group consisting of zinc, manganese, iron, calcium and cadmium, and accelerating the coating action of the solution by a sulphonated indigoid compound dissolved in the solution in an amount sufficient to effect such acceleration.

6. The method of producing a phosphate coating upon a surface composed principally of metal of the group consisting of iron, zinc, magnesium, copper, and aluminum, which comprises subjecting the surface to the action of a solution containing as its essential coating chemicals an acid phosphate of metal of the group consisting of zinc, manganese, iron, calcium and cadmium, and accelerating the coating action of the solution by a sulphonated indigoid compound dissolved in the solution in an amount sufficient to effect such acceleration, and producing the desired thickness and absorptivity of the resultant coating by applying the solution at the proper temperature.

7. The method of producing a phosphate coating upon a surface composed principally of iron, which comprises subjecting the surface to an aqueous solution containing as its essential coating chemicals acid zinc phosphate, accelerating the coating action of the solution by a sulphonated indigoid compound dissolved in said solution in an amount sufficient to effect such acceleration, and making the contact of the metal and solution at a temperature sufficiently above 150° F. to produce a thick, oil absorptive coating, weighing over 800 miligrams per square foot of coated surface.

8. The method of producing a phosphate coating upon a surface composed principally of iron, which comprises subjecting the surface to an aqueous solution containing as its essential coating chemicals acid zinc phosphate, accelerating the coating action of the solution by a sulphonated indigoid compound dissolved in said solution in an amount sufficient to effect such acceleration, and making the contact of the metal and solution at a temperature sufficiently below 150° F. to produce a paint-bonding coating weighing less than 800 milligrams per square foot of coated surface.

9. The method of producing a phosphate coating upon a surface composed principally of iron, which comprises subjecting the surface to an aqueous solution containing as its essential coating chemicals acid zinc phosphate, accelerating the coating action of the solution by a sulphonated indigoid compound dissolved in the solution in an amount sufficient to effect acceleration.

10. A method in accordance with claim 9, and in which the sulphonated indigoid compound is a salt of thioindigo disulphonic acid.

11. A method in accordance with claim 9, and in which the indigoid compound is a salt of 2-thionaphthene-2'-acenaphthylene-indigo-disulphonic acid.

12. A method in accordance with claim 9, and in which the indigoid compound is a salt of indigotin disulphonic acid.

13. The method of producing a phosphate coating on a surface composed principally of metal of the group consisting of iron, zinc, magnesium, copper, and aluminum which comprises subjecting the surface to an aqueous solution containing as its essential coating chemicals an acid phosphate salt of metal of the group consisting of zinc, manganese, iron, calcium and cadmium, supersaturated only to the degree which it becomes so by reaction with the work, and containing a sulphonated indigoid compound dissolved therein in an amount sufficient to accelerate the coating action.

14. A solution for coating metal of the group consisting of iron, zinc, magnesium, copper and aluminum which comprises as its essential coating chemicals acid phosphate of coating metal of the group consisting of zinc, manganese, iron, calcium and cadmium and sufficient sulphonated indigoid compound dissolved in the solution to accelerate the coating action.

15. A solution for coating metal of the group consisting of iron, zinc, magnesium, copper and aluminum which comprises as its essential coating chemicals zinc dihydrogen phosphate with sufficient acid to keep it in solution and sufficient sulphonated indigoid compound dissolved in the solution to accelerate the coating action.

16. A solution for coating metal of the group consisting of iron, zinc, magnesium, copper and aluminum which comprises as its essential coating chemicals manganese dihydrogen phosphate with sufficient acid to keep it in solution and sufficient sulphonated indigoid compound dissolved in the solution to accelerate the coating action.

17. A solution for coating metal of the group consisting of iron, zinc, magnesium, copper and aluminum which comprises as its essential coating chemicals ferrous dihydrogen phosphate with sufficient acid to keep it in solution and sufficient sulphonated indigoid compound dissolved in the solution to accelerate the coating action.

18. An aqueous solution for coating metal of the group consisting of iron, zinc, magnesium, copper and aluminum which comprises as its essential coating chemicals dihydrogen phosphate of coating metal of the group consisting of zinc, manganese, iron, calcium and cadmium with sufficient acid to keep it in solution and sufficient sulphonated indigoid compound dissolved in the solution to accelerate the coating action.

19. An aqueous solution for coating metal of the group consisting of iron, zinc, magnesium, copper and aluminum which comprises as its essential coating chemicals dihydrogen phosphate of coating metal of the group consisting of zinc, manganese, iron, calcium and cadmium with sufficient acid to keep it in solution and about 1% of the sodium salt of thioindigo disulphonic acid.

WILLIAM S. RUSSELL.

REFERENCES CITED

The following references are of record in the file of this patent:

UNITED STATES PATENTS

| Number | Name | Date |
| --- | --- | --- |
| 2,302,510 | Tanner et al. | Nov. 17, 1942 |
| 2,336,071 | Clifford et al. | Dec. 7, 1943 |

FOREIGN PATENTS

| Number | Country | Date |
| --- | --- | --- |
| 468,685 | Great Britain | July 6, 1937 |

OTHER REFERENCES

Hackh's Chemical Dictionary, Grant, 3rd edition, 1944, page 438.

Fuson and Snyder, Organic Chemistry 1942, pages 466–475.